United States Patent
Gu et al.

(10) Patent No.: US 11,237,063 B2
(45) Date of Patent: Feb. 1, 2022

(54) TEMPERATURE DETECTING DEVICE AND BATTERY PACK

(71) Applicant: CONTEMPORARY AMPEREX TECHNOLOGY CO., LIMITED, Ningde (CN)

(72) Inventors: Yanlong Gu, Ningde (CN); Xiaoteng Huang, Ningde (CN); Zhenxing Chen, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 176 days.

(21) Appl. No.: 16/572,687

(22) Filed: Sep. 17, 2019

(65) Prior Publication Data
US 2020/0049567 A1 Feb. 13, 2020

Related U.S. Application Data

(63) Continuation of application No. PCT/CN2019/090488, filed on Jun. 10, 2019.

(30) Foreign Application Priority Data

Aug. 13, 2018 (CN) .......................... 201821300384.9

(51) Int. Cl.
| | |
|---|---|
| *H01M 10/48* | (2006.01) |
| *G01K 1/14* | (2021.01) |
| *G01K 7/22* | (2006.01) |
| *H01M 10/625* | (2014.01) |
| *H01M 10/6552* | (2014.01) |
| *H01M 50/20* | (2021.01) |

(52) U.S. Cl.
CPC ................ *G01K 1/14* (2013.01); *G01K 7/22* (2013.01); *H01M 10/486* (2013.01);
(Continued)

(58) Field of Classification Search
CPC ............... H01M 10/625; H01M 10/62; H01M 10/6552; H01M 10/6553; H01M 10/655;
(Continued)

(56) References Cited

U.S. PATENT DOCUMENTS

| | | | |
|---|---|---|---|
| 9,373,832 B2 * | 6/2016 | Park | .................... H01M 10/486 |
| 2010/0135355 A1 | 6/2010 | Hermann et al. | |

(Continued)

FOREIGN PATENT DOCUMENTS

| | | |
|---|---|---|
| CN | 104729736 A | 6/2015 |
| CN | 206002219 U | 3/2017 |

(Continued)

OTHER PUBLICATIONS

International Search Report (and English translation) and Written Opinion of the International Searching Authority for International Patent Application No. PCT/CN2019/090488 dated Aug. 30, 2019.

(Continued)

*Primary Examiner* — Raymond Alejandro
(74) *Attorney, Agent, or Firm* — Heslin Rothenberg Farley & Mesiti P.C.

(57) ABSTRACT

A temperature detecting device is provided, which includes a housing, a temperature sensor and a fixed part. A battery pack is further provided, which includes two or more battery cells, a heat exchange tube, and the temperature detecting device. The temperature detecting device is fixed to an outer surface of the heat exchange tube, and a temperature detecting surface of the temperature detecting device is fitted to the outer surface of the heat exchange tube.

14 Claims, 4 Drawing Sheets

(52) U.S. Cl.
CPC ..... *H01M 10/625* (2015.04); *H01M 10/6552* (2015.04); *H01M 50/20* (2021.01); *H01M 2220/20* (2013.01)

(58) Field of Classification Search
CPC .... H01M 10/486; H01M 10/48; H01M 50/20; H01M 2220/20; G01K 1/14; G01K 7/22
See application file for complete search history.

(56) References Cited

U.S. PATENT DOCUMENTS

2014/0161151 A1   6/2014  Proctor et al.
2017/0250395 A1*  8/2017  Cheon ................. H01M 50/213

FOREIGN PATENT DOCUMENTS

| CN | 208443490 U | 1/2019 |
|----|-------------|--------|
| DE | 102016119430 A1 | 4/2018 |
| EP | 3124928 A2 | 2/2014 |
| EP | 2440894 B1 | 11/2016 |
| WO | 2010/143729 A1 | 12/2010 |

OTHER PUBLICATIONS

Extended European Search Report for European Patent Application No. 19762695.5 dated May 26, 2020.

* cited by examiner

TEMPERATURE DETECTING DEVICE AND BATTERY PACK

CROSS REFERENCE TO RELATED APPLICATIONS

This application is a continuation of International Application No. PCT/CN2019/090488, filed on Jun. 10, 2019, which claims the priority benefit of Chinese Patent Application No. 201821300384.9, filed on Aug. 13, 2018 and titled "A TEMPERATURE DETECTING DEVICE AND BATTERY PACK", the disclosures of each of which are hereby incorporated by reference herein in their entirety.

TECHNICAL FIELD

The present disclosure relates to the technical field of battery, more particular to a temperature detecting device and a battery pack including the temperature detecting device.

BACKGROUND

Since temperature has a significant influence on performance of a battery, a temperature control device is usually provided in the current battery pack for preheating or cooling the inside of the battery pack.

SUMMARY

Some embodiments of the present disclosure provide a battery pack temperature control device to solve the technical problem in the existing technology that a hole has to be provided in a heat exchange tube in a battery pack and that a temperature sensor sealing ring is susceptible to aging causing leakage of refrigerant.

Some embodiments of the present disclosure provide a temperature detecting device for a heat management system of a battery product. The temperature detecting device including a housing, a temperature sensor and a fixed part. A sensing portion of the temperature sensor is located on a surface of the housing, and the surface of the housing where the sensing portion is located is a temperature detecting surface.

The fixed part is detachably connected to the housing, and a space for accommodating an object to be measured to pass through is provided between the fixed part (20) and the temperature detecting surface (11).

In some embodiments, the fixed part is a U-shaped sheet structure and two ends of the fixed part are respectively connected to the housing.

In some embodiments, the two ends of the fixed part are respectively provided with a lug bending outwards, and card slots are respectively disposed on two sides of the temperature detecting surface on the housing.

In some embodiments, the lug of at one end of the fixed part is a lug formed by bending one end of the fixed part once, and the lug of at the other end of the fixed part is a V-shaped lug formed by bending the other end of the fixed part twice.

In some embodiments, the two ends of the fixed part are respectively provided with such a limiting groove as concave inwards from both sides of the fixed part in a width direction.

In some embodiments, the temperature detecting surface is provided with such an arc groove as extending from one end to the other end of the temperature detecting surface, and the sensing portion of the temperature sensor is located on the surface of the arc groove.

In some embodiments, the sensing portion of the temperature sensor protrudes from the surface of the arc groove, and the surface of the arc groove is provided with two or more fulcrums.

In some embodiments, the sensing portion of the temperature sensor is convexly located in the middle portion of the arc groove, a number of the fulcrums is two, and the two fulcrums and the sensing portion of the temperature sensor is triangular in distribution.

Some embodiments of the present disclosure further provide a battery pack including two or more battery cells, a heat exchange tube, and the temperature detecting device described above. The temperature detecting device is fixed to an outer surface of the heat exchange tube, and a temperature detecting surface of the temperature detecting device is fitted to the outer surface of the heat exchange tube.

In some embodiments, a heat exchange tube includes two or more tubes and a tube joint connecting the tubes, and the temperature detecting device is disposed on an outer surface of a tube or an outer surface of the tube joint.

As compared with the existing technology, the temperature detecting device of the present disclosure includes a housing, a temperature sensor and a fixed part. The sensing portion of the temperature sensor is located on the surface of the housing. The fixed part can fix the housing to the outer surface of the object to be measured, and make the sensing portion of the temperature sensor closely fitted to the object, thereby can accurately detect the temperature of the object. By using the temperature detecting device, the temperature of the object to be measured can be detected without opening. When the temperature detecting device is applied to temperature detection of a heat exchange tube of a battery pack, the problem of leakage of coolant inside the heat exchange tube can be effectively solved.

LIST OF REFERENCE SIGNS 1. temperature detecting device
10. housing
11. temperature detecting surface
12. harness socket
13. card slot
14. fin
15. fulcrum
111. arc groove 20. fixed part
21. fixed part body
22. lug
22-1. lug
22-2. lug
23. limiting groove
30. temperature sensor
40. heat exchange tube
41. three-way connector
5. battery cell

DETAILED DESCRIPTION

The technical content, structural features, objectives and effects of the technical solutions of the present disclosure will be described in detail below with reference to the accompanying drawings.

An existing temperature control device of a battery pack includes a heat exchange tube (i.e., a cooling tube) and a temperature sensor. The temperature sensor is generally installed in a heat exchange tube through a screw connection or a quick connector, and is configured to detect temperature of a refrigerant in the heat exchange tube. In the existing technology, it is necessary to provide an opening in the heat exchange tube, and extend the temperature sensor from the opening into the heat exchange tube, and seal the tube by using a sealing ring. However, the sealing ring has an aging phenomenon, which may cause leakage of the refrigerant in the heat exchange tube, and there is a certain safety hazard.

Based on the above, referring to FIG. 1 to FIG. 5, an embodiment of the present disclosure provides a temperature detecting device for a heat management system of a battery product. The temperature detecting device can be fixed to an outer surface of the heat exchange tube in the heat management system and collect temperature information of the heat exchange tube.

Figure 1:
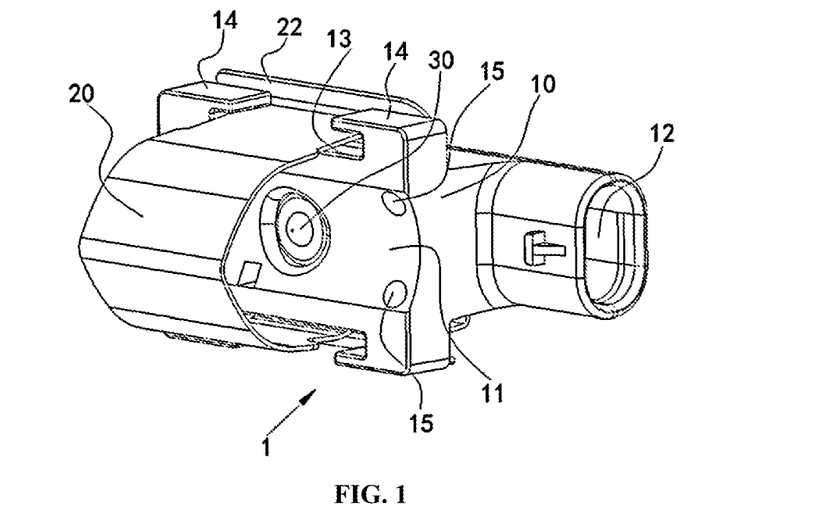
FIG. 1 is a schematic structural view of a temperature detecting device according to an embodiment of the present disclosure.

As shown in FIG. 1, the temperature detecting device includes a housing 10, a fixed part 20 and a temperature sensor 30 for collecting temperature information. Herein, the housing 10 is a supporting body of the temperature sensor 30, and the fixed part 20 is connected to the housing 10 for fixing the housing 10 and the temperature sensor 30 to the surface of an object to be measured (hereinafter referred to as the tested object), so that the temperature sensor 30 is fitted to a surface of the object and temperature of the tested object can be collected.

Specifically, the temperature sensor 30 may be disposed inside the housing 10, and a sensing portion of the temperature sensor 30 is located on an outer surface of the housing 10. In this way, the sensing portion of the temperature sensor 30 may directly contact the tested object. Herein, the sensing portion of the temperature sensor 30 refers to a sensitive area or structure for collecting a temperature change in the temperature sensor (apart from the sensing portion, the temperature sensor generally further includes structures such as an output pin and a housing, etc). The surface of the housing 10 where the sensing portion of the temperature sensor 30 is located is a temperature detecting surface 11 of the temperature detecting device 1, and the temperature detecting surface 11 is a surface of the housing 10 that is in contact with the tested object. In the temperature detecting device 1, the temperature sensor 30 is disposed inside the housing 10, and the sensing portion of the temperature sensor 30 is exposed to the temperature detecting surface 11 of the housing 10, which not only facilitates fixing the temperature sensor 30 to prevent the temperature sensor 30 from moving, but also can enable the sensing portion of the temperature sensor 30 to directly contact the surface of the tested object, thereby ensuring accuracy of temperature detection. Besides, in practice, the temperature sensor 30 may otherwise be a chip sensor attached directly to the surface of the housing 10.

The temperature sensor 30 is such a thermistor having varied resistance values in different temperatures. According to different temperature coefficient, the thermistor may be classified into a positive temperature coefficient thermistor (PTC) and a negative temperature coefficient thermistor (NTC). An output resistance value of the positive temperature coefficient thermistor becomes larger as the increase of an environment temperature, and the output resistance value of the negative temperature coefficient thermistor becomes smaller as the increase of the environment temperature. Therefore, a temperature value of the tested object can be obtained according to the resistance value of a thermistor. In the temperature detecting device 1, the thermistor has advantageous in its small size, high sensitivity and good stability. The temperature sensor 30 is preferably a negative temperature coefficient thermistor (NTC).

It is natural that the temperature sensor 30 may also be other temperature sensors such as a thermocouple. The temperature sensor 30 may be directly disposed on the surface of the housing 10, and bring the sensing portion of the temperature sensor 30 into contact with the tested object.

As shown in FIG. 1, in order to facilitate data output of the temperature sensor 30, a harness socket 12 is disposed on the housing 10. The harness socket 12 is preferably disposed on a side of the housing 10 opposite to the temperature detecting surface 11. A metal connecting piece is disposed in the harness socket 12 (the metal connecting piece is inside the housing 10, not shown in the drawings). One end of the metal connecting piece is connected to the output pin of the temperature sensor 3, while the other end is located in the harness socket 12 for collecting harness. When the collecting harness is inserted into the harness socket 12, the collecting harness is electrically connected to the metal connecting piece, so that the temperature sensor 30 is connected to the collecting harness, and an output signal of the temperature sensor 30 can be received through the collecting harness. In order to ensure connection between the collecting harness and the harness socket 12 while facilitating plugging operation of the connecting harness, the harness socket 12 and the collecting harness may be connected by a quick connector.

Figure 2:
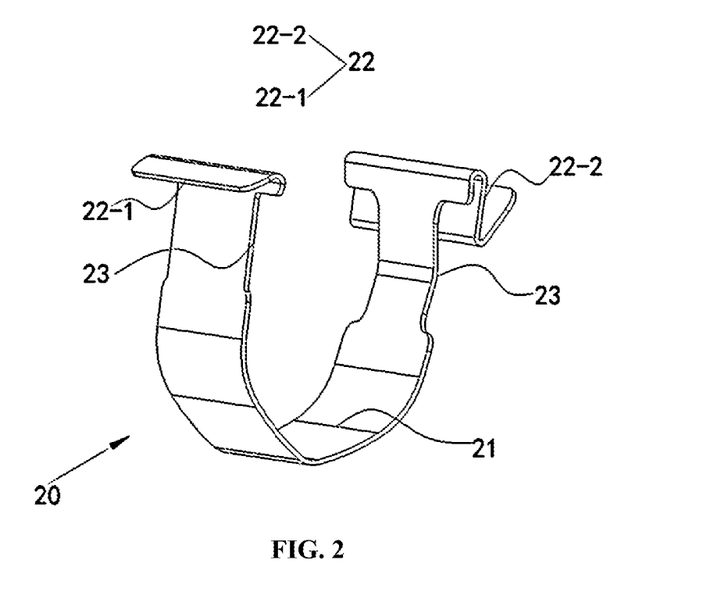
FIG. 2 is a schematic structural view of a fixed part according to an embodiment of the present disclosure.
Figure 3:
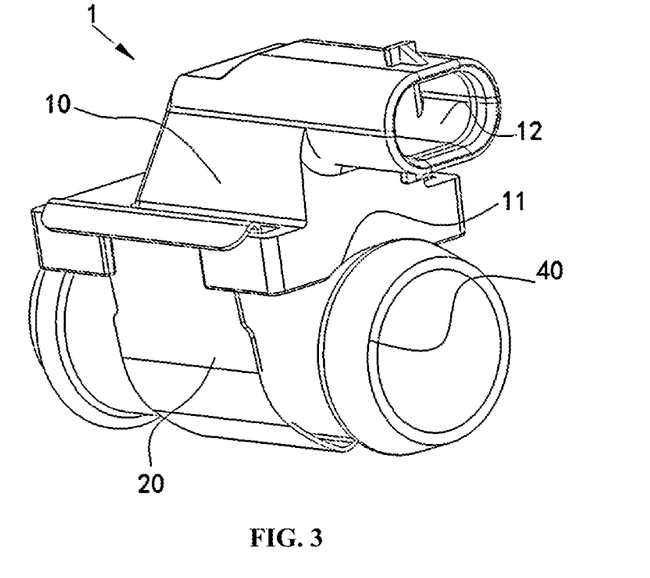
FIG. 3 is a schematic structural view of a temperature detecting device applied to a heat exchange tube according to an embodiment of the present disclosure.

As shown in FIG. 1 to FIG. 3, the fixed part 20 is configured to fix the temperature detecting device 1 to the tested object, so that the temperature detecting surface 11 and the sensing portion of the temperature sensor 30 come in contact with the tested object (i.e., a heat exchange tube 40). In the temperature sensing device 1, the fixed part 20 has a U-shaped sheet structure, and two ends of the fixed part 20 are respectively connected to the housing. The U-shaped sheet structure of the fixed part 20 facilitates fixing the temperature detecting device 1 to an outer wall of a tubular or columnar tested object. Herein, an opening of the U-shaped sheet structure is opposite to the temperature detecting surface 11 on the housing 10, and both ends (i.e., two ends of the fixed part 20) of an opening of the U-shaped sheet structure is connected to the housing 10, so that a middle portion of the U-shaped sheet structure and the temperature detecting surface 11 form a space that allows the tested object (the heat exchange tube 40) to pass through, that is, the tested object passes through the space between the U-shaped sheet structure and the temperature detecting surface 11.

FIG. 3 shows a schematic structural view of the temperature detecting device 1 for detecting temperature of the heat exchange tube 40 in the battery pack. Herein, a U-shaped fixed part 20 surrounds an outer wall of the heat exchange tube 40, and both ends of the U-shaped piece fixed part 20 are respectively connected to the housing 10, so that the temperature detecting surface 11 of the housing 10 is close contact with the outer wall of the heat exchange tube 40. Therefore, the temperature sensor 30 may be in contact with the outer wall of the heat exchange tube 40.

Herein, the fixed part 20 may be a U-shaped sheet structure formed by cutting and bending a metal sheet. As shown in FIG. 2, in order to facilitate fixing the temperature detecting device 1 to the outer wall of the tested object, the fixed part 20 and the housing 10 are connected by a snap-fit manner, and the fixed part 20 includes a fixed part body 21 and a lug 22 disposed at two ends of the fixed part body 21. The lug 22 may be formed by bending the two ends of the fixed part body 21 outwards respectively. Card slots 13 adapted to the two ends of the fixed part are respectively provided in two sides of the temperature detecting surface 11 on the housing 10. A material of the U-shaped piece fixed part 20 may be selected from spring steel, and the fixed part body 21 may form a U shape by bending many times. Since spring steel has better elasticity, the U-shaped piece fixed part 20 formed by bending has a certain elasticity. When the fixed part 20 is fixed to the tested object, the fixed part 20 may counteract partial tube diameter tolerance or assembly error, so that the temperature detecting device 1 is firmly fixed to the tested object.

Specifically, as shown in FIG. 1, each of the card slots 13 is formed by two fins 14 disposed opposite to each other on the surface of the housing 10, and a top portion of one fin 14 protrudes toward the top portion of the other fin 14, thereby forming the card slot 13 having a broad bottom and a narrow top. As shown in FIG. 2, the two ends of the fixed part 20 are respectively provided with such limiting grooves 23 as concave inwards from both sides of the fixed part 20 in a width direction. A width of the fixed part 20 disposed at the limiting groove is matched with the width of the card slot 13, so that the limiting groove 23 at both ends of the fixed part 20 can be engaged into the card slot 13. The lugs 22 at both ends of the fixed part 20 can prevent the two ends of the fixed part 20 from falling off the card slots 13.

In order to facilitate fitting of the fixed part 20 and the card slot 13, in the temperature detecting device 1, one lug 22-1 at one end (the left side of FIG. 2) of the fixed part body 21 may be formed by bending one end of the fixed part body 21 outwards once, and the other lug 22-2 at the other end (the right side of FIG. 2) of the fixed part body 21 is a V-shaped structure having a certain elasticity and formed by bending the other end of the fixed part body 21 twice (bending outwards once and then bending in an opposite direction for a second time, so as to form a V-shaped structure at the outer side of the fixed part body). When the temperature detecting device is fixed to the heat exchange tube 40, the temperature detecting surface 11 of the housing 10 in the temperature detecting device may be attached to the outer wall of the heat exchange tube 40, and then the lug 22-1 is engaged into the card slot 13 in the corresponding side, an opening of the V-shaped lug 22-2 is compressed, and the lug 22-1 is finally engaged in the card slot 13 in the other side. Since the lug 22-2 is a V-shaped structure having a certain elasticity, so that the fixed part body 21 can have a certain margin (i.e., the fixed part body 21 may be processed appropriately longer), so as to facilitate the operation of the lug 22-2 insert into the card slot, and the lug 22-2 elastically compresses an inner wall of the card slot 13 after being engaged into the card slot 13, thereby preventing the lug 22-2 from falling off the card slot.

In the temperature detecting device 1, both ends of the fixed part 20 may be fixed to the housing 10 by using other fixing structures such as a nut or rivet in addition to the snap-fit connection described above.

Figure 4:
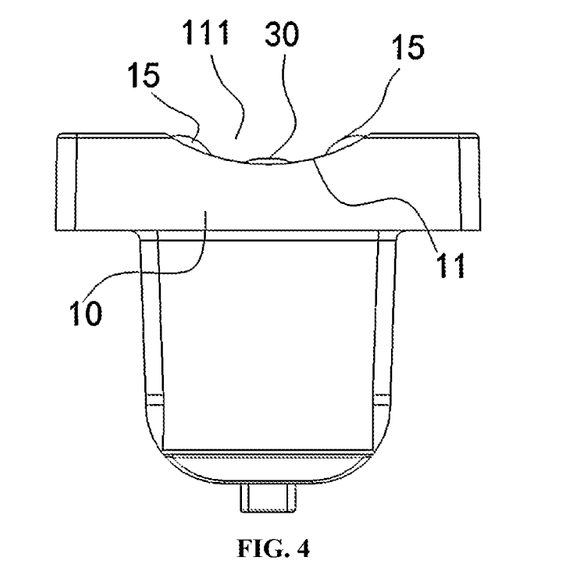
FIG. 4 is a schematic view of fulcrums on the surface of an arc groove in a temperature detecting device according to an embodiment of the present disclosure.

As shown in FIG. 4, in order to enable the temperature detecting device 1 to be better applied to a tested object having an arcuate outer wall, an arc groove 11 is disposed on the temperature detecting surface 11 of the housing 10, and an radian of the arc groove 11 may be defined by the radian of the outer wall of the tested object. The arc groove 111 extends from one end to the other end of the temperature detecting surface 11, and the sensing portion of the temperature sensor 30 is located on the surface of the arc groove 111. As shown in FIG. 3, the outer wall of the tested object (i.e., the heat exchange channel 40 in the drawings) is in contact with the arc groove 111 so that the arc groove 111 can be fitted to the outer wall of the tested object. In the temperature detecting device 1, the arc groove 111 is disposed on the temperature detecting surface 11, on the one hand, the contact area between the temperature detecting surface 11 and the outer wall of the tested object (i.e., the heat exchange tube 40 in the drawings) can be increased, and on the other, the arc groove 11 can prevent the sensing portion of the temperature sensor 30 from being displaced from the tested object, thereby ensuring accuracy of temperature detection.

Further, when the temperature detecting device 1 is fixed to the texted object, in order to enable the temperature sensor 30 to be in close contact with the outer wall of the tested object, in the temperature detecting device 1, the sensing portion of the temperature sensor 30 protrudes from the surface of the arc groove 111, and two or more fulcrums 15 protruding toward the surface of the arc groove are provided on the surface of the arc groove 111, a height of the protruding fulcrums 15 is equal to the height of a convex of the sensing portion of the temperature sensor 30. That the sensing portion of the temperature sensor 30 protrudes from the surface of the arc groove 111 may ensure the sensing portion of the temperature sensor 30 close contact with the outer wall of the tested object, and coordination between the fulcrums 15 and the temperature sensor 30 makes the tested object and the arc groove 111 disposed coaxially with an axis. Preferably, the temperature sensor 30 may be disposed in the middle of the arc groove 111, a number of the fulcrums 15 is two, and the sensing portion of the temperature sensor 30 and the two fulcrums 15 are respectively located at three vertexes of a triangle. In this way, the sensing portion of the temperature sensor 30 may be directly opposite the outer wall of the tested object, and the two fulcrums 15 and the sensing portion of the temperature sensor 30 are triangularly distributed, thereby preventing the problem that the sensing portion of the temperature sensor 30 is in poor contact with the tested object caused by height error of the fulcrums 15.

Figure 6:
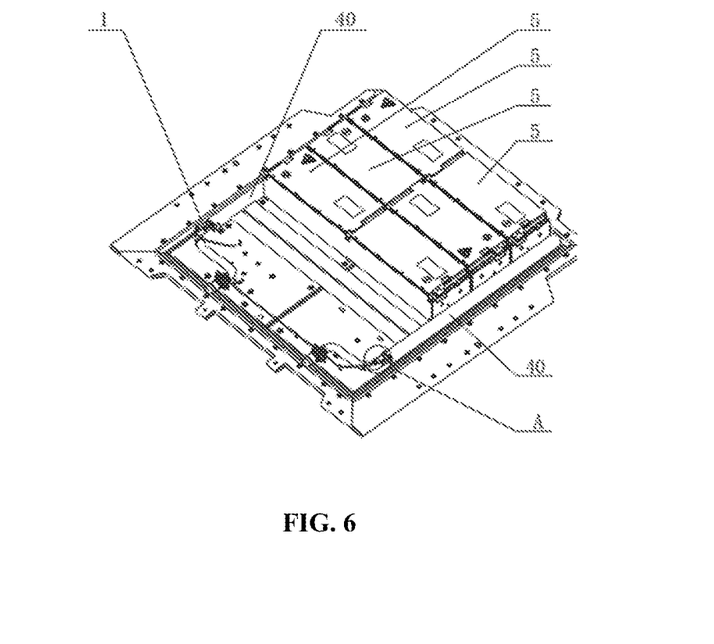
FIG. 6 is a schematic structural view of a battery pack according to an embodiment of the present disclosure.

In one embodiment, as shown in FIG. 6, the present disclosure provides a battery pack. The battery pack includes two or more battery cells 5, which can be electrically connected in series or in parallel, etc. Herein, the battery cells 5 are preferably lithium battery cells. The battery pack can be used for storing electric energy, in particular can be used as drive batteries of new energy vehicles to provide power for power motors of new energy vehicles.

A heat exchange tube 40 is disposed in the battery pack, and the heat exchange tube 40 is disposed between the battery the battery cells and is in contact with the outer wall of the battery cell. Heat exchange medium (which generally is a coolant) flows in the heat exchange tube 40. The heat exchange tube 40 is configured to preheat or cool the battery cells 5. Since the heat exchange tube 40 is configured to cool the battery cells in most occasions, the heat exchange tube 40 is usually named cooling tube. The battery cells 5 and the heat exchange tube 40 are existing technology in the battery pack field and will not be described herein.

The battery pack is further disposed with a temperature detecting device, as shown in FIG. 6, the temperature detecting device is configured to detect temperature of the heat exchange tube 40. Different from a conventional battery pack temperature detecting device, the temperature detecting device is the above-described temperature detecting device 1. As shown in FIG. 1, the temperature detecting device 1 includes a housing 10, a fixed part 20 and a temperature sensor 30. Herein, the sensing portion of the temperature sensor 30 is located on the outer surface of the housing 10. The temperature detecting device 1 is fixed to the outer surface of the heat exchange tube 40 by the fixed part 20, so that the temperature detecting surface 11 of the temperature detecting device 1 is fitted to the outer surface of the heat exchange tube 40. Therefore, the temperature of the heat exchange tube 40 can be detected through the temperature detecting device 1.

Figure 5:
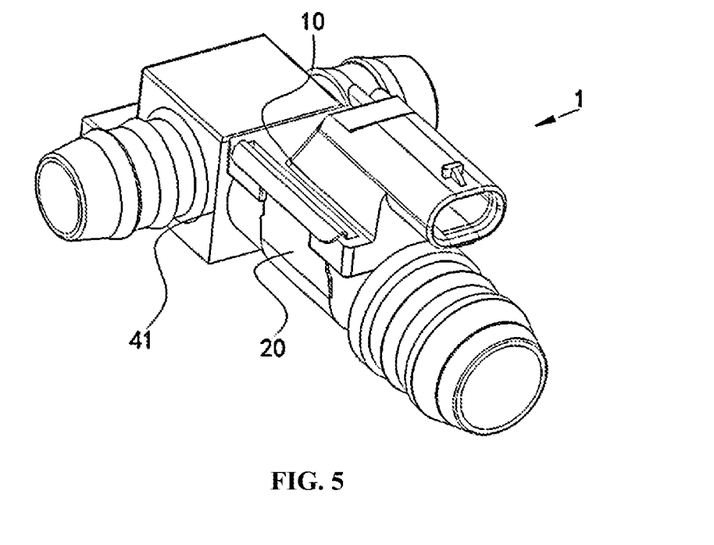
FIG. 5 is a schematic structural view of a temperature detecting device disposed on a three-way connector according to an embodiment of the present disclosure.
Figure 7:
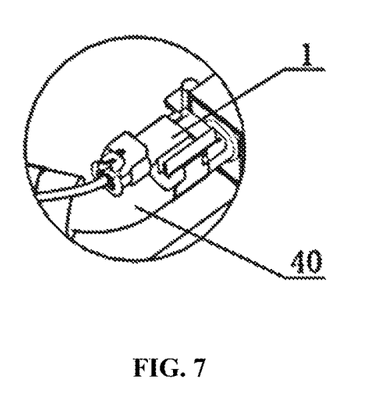
FIG. 7 is a partial enlarged view of portion A in FIG. 6.

In a battery pack, the heat exchange tube 40 is formed by bending a single metal tube. In this case, the temperature detecting device 1 is directly fixed to the outer surface of the heat exchange tube, as shown in FIG. 7. It is natural that the heat exchange tube 40 may include two or more tubes and a tube joint connecting the tubes. Herein, the tube joint may be a two-way connector connecting two tubes or a three-way connector connecting three tubes. In this case, the temperature detecting device 1 may be fixed to the tube in the same way of fixing as shown in FIG. 7, or may be fixed to a two-way connector or a three-way connector. As shown in FIG. 5, the heat exchange tube includes a T-shaped three-way connector 41 that includes two joints laterally disposed and one joint longitudinally disposed. The three joints are respectively connected with tubes, and the temperature detecting device 1 may be fixed to the tube of the longitudinal joint of the three-way connector 41.

In the existing technology, it is necessary to dispose an opening in the heat exchange tube 40 when detecting the temperature of the heat exchange tube 40, and then a temperature sensor is extended into the heat exchange tube 40. While in the embodiments of the present disclosure, it is unnecessary to provide an opening in the heat exchange tube 40, but it is only required to hold the housing 10 and the temperature sensor 30 to the outer surface of the tested object by the fixed part 20 so that the sensing portion of the temperature sensor 30 is brought into contact with the outer wall of the heat exchange tube 40. Therefore, the temperature of the heat exchange tube 40 can be accurately detected by the temperature sensor 30, thereby effectively solving the problem of leakage of coolant due to aging of sealant in the existing technology.

It should be noted that the above-described embodiments in the present disclosure are not intended to impose a limitation to the protection scope of the present disclosure. Therefore, ideas an innovative concept based on the present disclosure, changes and modifications to the embodiments of the present disclosure, equivalent structures or procedure variants according to the specification and the accompany drawings of the present disclosure, and direct or indirect application of the above-described technical solutions to other relevant technical fields all fall into the protection scope of the present disclosure.

What is claimed is:

1. A temperature detecting device for a heat management system of a battery product, comprising,
    a housing,
    a temperature sensor, and
    a fixed part,
    wherein a sensing portion of the temperature sensor is located on a surface of the housing, and the surface of the housing where the sensing portion located is a temperature detecting surface;
    wherein the temperature detecting surface is provided with an arc groove extending from one end to the other end of the temperature detecting surface, and the sensing portion of the temperature sensor is located on the surface of the arc groove;
    wherein the sensing portion of the temperature sensor protrudes from the surface of the arc groove, and the surface of the arc groove is provided with two fulcrums;
    wherein the sensing portion of the temperature sensor is convexly located in the middle portion of the arc groove, the two fulcrums and the sensing portion of the temperature sensor is triangular in distribution;
    wherein the fixed part is detachably connected to the housing, a space is provided between the fixed part and the temperature detecting surface, and the space is configured to be passed through by an object measured by the temperature sensor.

2. The temperature detecting device according to claim 1, wherein the fixed part has a U-shaped sheet structure and two ends of the fixed part are respectively connected to the housing.

3. The temperature detecting device according to claim 2, wherein the two ends of the fixed part are respectively provided with a lug bending outwards, and card slots are respectively disposed on two sides of the temperature detecting surface on the housing.

4. The temperature detecting device according to claim 3, wherein the lug at one end of the fixed part is a lug formed by bending one end of the fixed part once, and the lug at the other end of the fixed part is a V-shaped lug formed by bending the other end of the fixed part twice.

5. The temperature detecting device according to claim 3, wherein the two ends of the fixed part are respectively provided with such a limiting groove as concave inwards from both sides of the fixed part in a width direction.

6. The temperature detecting device according to claim 1, wherein the two ends of the fixed part are respectively provided with a lug bending outwards, and card slots are respectively disposed on two sides of the temperature detecting surface on the housing.

7. The temperature detecting device according to claim 6, wherein the lug at one end of the fixed part is a lug formed by bending one end of the fixed part once, and the lug at the other end of the fixed part is a V-shaped lug formed by bending the other end of the fixed part twice.

8. The temperature detecting device according to claim 6, wherein the two ends of the fixed part are respectively provided with such a limiting groove as concave inwards from both sides of the fixed part in a width direction.

9. A battery pack, comprising
    two or more battery cells,
    a heat exchange tube, and
    a temperature detecting device comprising:
    a housing, a temperature sensor, and a fixed part, wherein a sensing portion of the temperature sensor is located on a surface of the housing, and the surface of the housing where the sensing portion located is a temperature detecting surface;

wherein the temperature detecting surface is provided with an arc groove extending from one end to the other end of the temperature detecting surface, and the sensing portion of the temperature sensor is located on the surface of the arc groove;

wherein the sensing portion of the temperature sensor protrudes from the surface of the arc groove, and the surface of the arc groove is provided with two fulcrums;

wherein the sensing portion of the temperature sensor is convexly located in the middle portion of the arc groove, the two fulcrums and the sensing portion of the temperature sensor is triangular in distribution;

wherein the fixed part is detachably connected to the housing, a space is provided between the fixed part and the temperature detecting surface, and the space is configured to be passed through by an object measured by the temperature sensor;

wherein the temperature detecting device is fixed to an outer surface of the heat exchange tube, and a temperature detecting surface of the temperature detecting device is fitted to the outer surface of the heat exchange tube.

10. The battery pack according to claim 9, wherein the heat exchange tube comprises two or more tubes and a tube joint connecting the tubes, and the temperature detecting device is disposed on an outer surface of the tube or an outer surface of the tube joint.

11. The battery pack according to claim 9, wherein the fixed part has a U-shaped sheet structure and two ends of the fixed part are respectively connected to the housing.

12. The battery pack according to claim 11, wherein the two ends of the fixed part are respectively provided with a lug bending outwards, and card slots are respectively disposed on two sides of the temperature detecting surface on the housing.

13. The battery pack according to claim 12, wherein the lug at one end of the fixed part is a lug formed by bending one end of the fixed part once, and the lug at the other end of the fixed part is a V-shaped lug formed by bending the other end of the fixed part twice.

14. The battery pack according to claim 13, wherein the two ends of the fixed part are respectively provided with such a limiting groove as concave inwards from both sides of the fixed part in a width direction.

* * * * *